(12) United States Patent
Sookswat (10) Patent No.: US 7,802,502 B2
(45) Date of Patent: Sep. 28, 2010

(54) TOOL FOR ATTENUATING VIBRATION IN A DISK BRAKE ROTOR DURING THE MACHINING THEREOF

(76) Inventor: Surin Sookswat, 5193 S. Laredo Way, Centennial, CO (US) 80015

( * ) Notice: Subject to any disclaimer, the term of this patent is extended or adjusted under 35 U.S.C. 154(b) by 31 days.

(21) Appl. No.: 12/099,464

(22) Filed: Apr. 8, 2008

(65) Prior Publication Data

US 2009/0249927 A1    Oct. 8, 2009

(51) Int. Cl.
    *B23B 25/00*    (2006.01)
(52) U.S. Cl. .............................. 82/163; 82/112; 82/904
(58) Field of Classification Search ................... 82/112, 82/163, 904; 269/3, 6, 249; 267/136, 137; 188/71.7, 73.37
    See application file for complete search history.

(56) References Cited

U.S. PATENT DOCUMENTS

| 448,452 | A | * | 3/1891 | Miller | 269/3 |
|---|---|---|---|---|---|
| 800,685 | A | * | 10/1905 | Scroggins | 269/71 |
| 998,248 | A | * | 7/1911 | Jahn | 269/161 |
| 1,039,831 | A | * | 10/1912 | Sisson | 269/3 |
| 1,473,880 | A | * | 11/1923 | Schwager | 269/258 |
| 1,740,238 | A | * | 12/1929 | Gustafson | 269/179 |
| 2,241,021 | A | * | 5/1941 | Riebe | 269/218 |
| 2,990,738 | A | * | 7/1961 | Zysset | 269/97 |
| 3,170,708 | A | * | 2/1965 | Miller | 280/47.32 |
| 3,691,878 | A | * | 9/1972 | Mitchell | 82/1.11 |
| 3,710,661 | A | * | 1/1973 | Mitchell | 82/163 |
| 4,039,178 | A | * | 8/1977 | Odames | 269/75 |
| 4,094,101 | A | * | 6/1978 | Robinson | 451/72 |
| 4,178,819 | A | * | 12/1979 | Mahon | 82/163 |
| 4,531,434 | A | * | 7/1985 | Vasquez | 82/152 |
| 4,583,724 | A | * | 4/1986 | Huang | 269/88 |
| 4,921,234 | A | * | 5/1990 | Peterson | 269/147 |
| 4,930,966 | A | * | 6/1990 | Chien | 414/427 |
| 4,997,172 | A | * | 3/1991 | Mumm et al. | 269/3 |
| 5,297,460 | A | * | 3/1994 | Hartman et al. | 82/163 |
| 5,326,076 | A | * | 7/1994 | Sorensen et al. | 269/182 |
| 5,443,246 | A | * | 8/1995 | Peterson | 269/283 |
| 5,765,457 | A | * | 6/1998 | Meyer et al. | 82/112 |
| 5,997,018 | A | * | 12/1999 | Lee | 280/87.042 |
| 6,039,313 | A | * | 3/2000 | Baculy | 269/168 |
| 6,099,387 | A | * | 8/2000 | Gilmer et al. | 451/10 |
| 6,227,085 | B1 | * | 5/2001 | Vasquez, Jr. | 82/163 |
| 6,363,821 | B1 | * | 4/2002 | Greenwald et al. | 82/1.11 |
| 6,553,877 | B2 | * | 4/2003 | Vasquez, Jr. | 82/163 |

(Continued)

FOREIGN PATENT DOCUMENTS

DE    3816172 A1 * 11/1989

*Primary Examiner*—Jason Daniel Prone
*Assistant Examiner*—Jennifer Swinney
(74) *Attorney, Agent, or Firm*—Leyendecker & Lemire, LLC; Kurt P. Leyendecker; Terrence M. Wyles (57) ABSTRACT

An improved tool for attenuating vibration in a disk brake rotor during the machining (or facing) thereof using a disk brake lathe is described. In its most basic form, embodiments of the tool comprise a pair of substantially linear and parallel spaced apart legs that are fixedly coupled together by way of a coupling section proximate their proximal ends and have opposing pads attached to the opposing distal ends. An adjustable clamping mechanism is also provided through which the distance between the legs can be varied and/or the biasing force applied against opposing brake rotor surfaces can be varied by way of the legs acting through the pads.

19 Claims, 4 Drawing Sheets

U.S. PATENT DOCUMENTS

| | | | |
|---|---|---|---|
| 6,591,720 B1 * | 7/2003 | Greenwald et al. | 82/112 |
| 6,865,672 B1 | 3/2005 | Sipe | |
| 6,865,972 B1 * | 3/2005 | Sipe | 82/112 |
| 6,889,966 B2 * | 5/2005 | Wirth et al. | 269/6 |
| 7,114,420 B1 * | 10/2006 | Oppermann | 82/163 |
| 7,475,892 B2 * | 1/2009 | Dudding et al. | 280/124.11 |
| 2004/0245692 A1 * | 12/2004 | Brass et al. | 269/3 |
| 2005/0184439 A1 * | 8/2005 | Janson et al. | 269/6 |
| 2006/0055098 A1 * | 3/2006 | Siegel | 269/279 |
| 2006/0207394 A1 * | 9/2006 | Coffman | 82/1.11 |
| 2007/0245876 A1 * | 10/2007 | Kelly | 83/581 |

\* cited by examiner

TOOL FOR ATTENUATING VIBRATION IN A DISK BRAKE ROTOR DURING THE MACHINING THEREOF

FIELD OF THE INVENTION

The invention relates to tools used to attenuate vibration and noise associated therewith created when machining a disk brake rotor.

BACKGROUND

Automotive brake disks are periodically machined using a disk brake rotor lathe in order to remove any warping or other variation that has presented itself during thousands of miles of use. The disk brake rotor lathe typically comprises a pair of cutting arms that are placed against the surfaces of a disk brake rotor and moved radially along the surfaces at a desired depth of cut to remove the warpage and return the surface to more planar configuration.

The process of moving the cutting arms radially while pressed against the opposing surfaces cause vibrations that both produce undesirable high decibel noise and chatter that inhibits the machining of the rotor surfaces to a suitable degree of planarity. Accordingly, it is desirable to attenuate these vibrations to both reduce the risk of damage to the ears of workers within earshot of an operating lathe and to more ensure a higher quality more planar rotor surfaces.

Several dampening devices are known in the art, such as described in U.S. Pat. Nos. 3,710,661; 4,178,819; 4,531,434; 5,297,460; 6,227,085; 6,591,720 ('720); 6,865,972; and 7,114,420 ('420), all of which suffer from one problem or another that has prevented the devices from being adopted by many brake rotor mechanics.

The prior art device taught in the '720 patent is illustrative. Like many of the prior art devices it comprises a thin gauge wire (approximately 1/8" in diameter or thereabouts) bent into a u-shape that acts to at least partially bias opposing friction pads attached to the wire's ends towards each other. The biasing force helps keep at least a portion of the pads in contact with opposing surfaces of the brake rotors as the rotors are being machined. In practice, the biasing force does not hold the pads against the rotors tightly enough to prevent much of the undesirable vibration. Accordingly, many variations of this type of vibration attenuating device include coiled springs spanning between the arms of the u-shaped wire to provide additional biasing force. To prevent the spring from sliding down the arms which are typically canted towards each other, the steel arms are often coated with a plastic covering to increase the friction between the ends of the spring and the arms. However, the spring cannot be so stiff as to prevent a user from easily pulling the pads apart to place the device over a brake rotor. Unfortunately, a spring that is compliant enough to permit ease of use does not provide enough biasing force to prevent vibration in many instances. Furthermore, through extensive use the plastic cover often wears away causing the spring to slide down the arms when the device is in use and thereby reducing the biasing force as the spring unloads.

The forgoing problem concerning the auxiliary coil spring seems to have been the basis for replacing the spring with a rigid clip in the '420 patent, which describes a device similar to that in the '720 save for the spring to clip substitution. It can be appreciated that the clip does greatly increase the biasing load; however, the clip can be difficult to actuate and as such may not be adopted by many brake rotor machinists. Even when a clip is used, the ultimate load that may be applied by the prior art device is limited somewhat be the relatively low flexural stiffness of the u-shaped wire and the relatively low bending moment created along the wire between the clip and the pads.

Ultimately, because of the issues and problems associated with the prevailing prior art designs, rotor machinists have tended not to use the prior art vibration attenuating devices even when the devices are available to them.

DETAILED DESCRIPTION

An improved tool for attenuating vibration in a disk brake rotor during the machining (or facing) thereof using a disk brake lathe is described. In its most basic form, embodiments of the tool comprise a pair of substantially linear and parallel spaced apart legs that are fixedly coupled together by way of a coupling section proximate their proximal ends and have opposing pads attached to the opposing distal ends. An adjustable clamping mechanism is also provided through which the distance between the legs can be varied and/or the biasing force applied against opposing brake rotor surfaces can be varied by way of the legs acting through the pads.

In variations, the legs are comprised of cylindrical steel rods. Typically, the steel rods are 0.175" in diameter such that they can transfer a significant amount of biasing force from the clamp to the pads through the legs unlike prior art tools having much thinner diameters. In some variations, the legs may comprise portions of a U-shaped rod with the bent or curved section of the rod comprising the aforementioned coupling section. In other variations, the coupling section may comprise a distinct element such as a block to which the leg ends are affixed.

In certain embodiments and variations, the clamp is adapted to freely slide along the legs so as to vary the magnitude of the biasing force that can be transferred to the rotor surfaces through the pads for a given clamp position. Specifically, when the clamp is slid closer to the pads the amount of flexure of the portion of the legs between the clamp and the pads is decreased thereby increasing the potential biasing force. In converse, as the distance between the clamp and the pads is increased, the legs can flex more thereby decreasing the potential biasing force. Additionally, by being able to slide the clamp along the legs the tool can be adjusted (i) for rotors of different sizes and/or (ii) to place the tool in the most desirable radial position on a rotor to minimize vibration while maintaining the maximum biasing force.

In at least one embodiment, the clamp comprises a pair of brackets or blocks that are slidably received on respective legs by way of a bore or opening in each block. The clamping force is applied by way of a threaded fastener and associated nut that extends between the blocks and through a second bore in the brackets that is generally perpendicular to the first bore. Each of the blocks are typically inhibited from rotating about the longitudinal axis of the leg to which they are slidably attached. In the variation illustrated herein, the legs are cylindrical as are the associated bores which would typically facilitate rotational movement of the blocks as the fastener is tightened especially when the legs are received in the bores loosely enough to facilitate the aforementioned sliding. To inhibit twisting and block rotation, a u-shaped rod that is coupled to each block at a respective end is utilized. Operationally, a biasing force developed in the u-shaped rod as the arms thereof are compressed counteracts and rotational or twisting forces resulting from the tightening of the fastener.

In other variations of the clamp utilizing blocks/brackets and one or more associated fasteners the urge of the blocks/brackets to rotate or twist can be inhibited using other mechanisms. For instance, the legs and their associated bores in the blocks could be non-cylindrical, such as rectangular, to prevent rotation but permit longitudinal sliding movement along the leg. In yet other variations, pairs of threaded fasteners can be utilized by placing one fastener and associated nut below and perpendicular to the parallel legs and another fastener above and perpendicular to the parallel legs. Operationally, each fastener is tightened in unison to provide the clamping force and counteract any twisting moments applied by the other fastener.

Advantageously, the foregoing features as incorporated selectively or in combination in embodiments of the vibration attenuating tool of the present invention act to ameliorate many of the problems associated with the use of the prior art tools.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation" and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of ±20%. Also, as applicable, the term "substantially" as used herein unless otherwise indicated means a margin of ±10%. It is to be appreciated that not all uses of the above terms are quantifiable such that the referenced ranges can be applied.

The term "rod" as used herein refers to a rigid or at least semi-rigid elongated member being substantial in length relative to its widthwise dimensions. A "rod" may be substantially linear or it may be formed into non-linear shapes such as the "u-shaped rod" described and illustrated herein. The cross section of a rod can comprise any number of shapes including, but not limited to, rectangular, circular and oval. The "rod" may be solid or it may be tubular.

The term "u-shaped rod" as used herein refers to a "rod" having elongated portions (arms or legs) that are generally parallel and typically linear that are integral with a bent or curved portion. The bent or curved portion is often annular but need not be so in all variations. For instance, the bent portion could comprise several sharp angular bends that generally form a "v" shape.

An Embodiment of the Vibration Attenuating Tool

Figure 1:
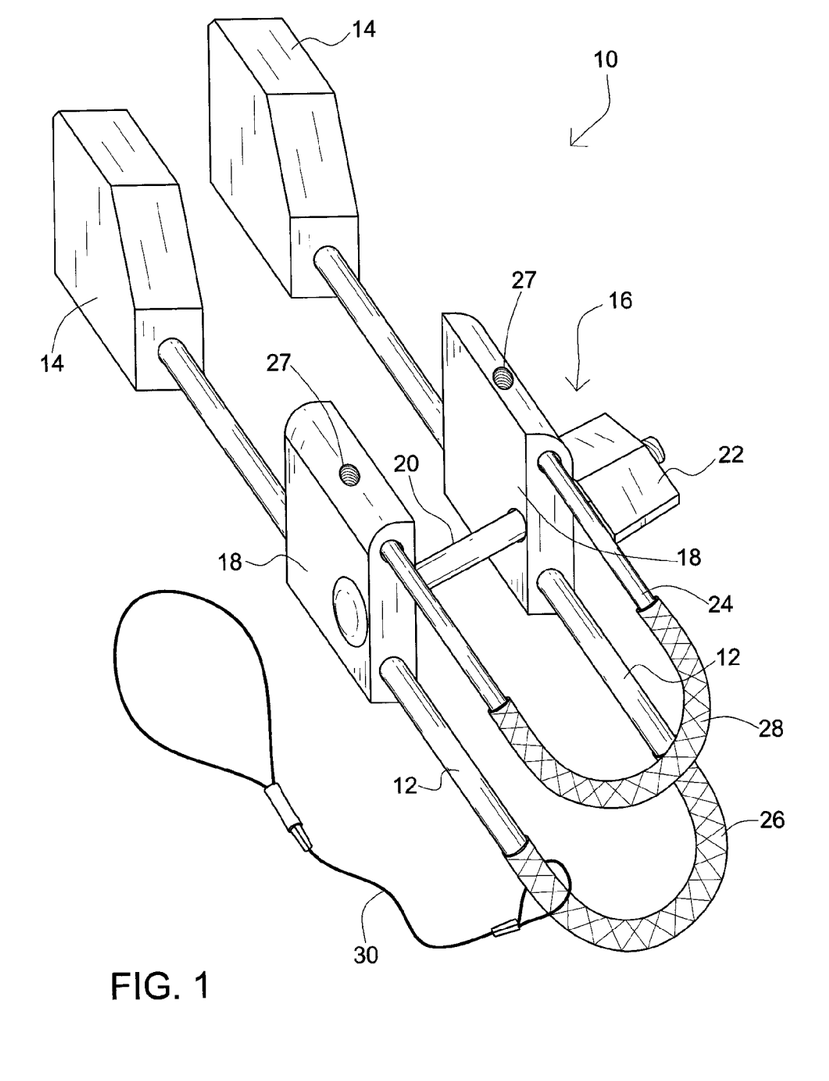
FIG. 1 is an isometric view of a tool for attenuating vibrations in a disk rotor during the machining thereof according to one embodiment of the invention.
Figure 2:
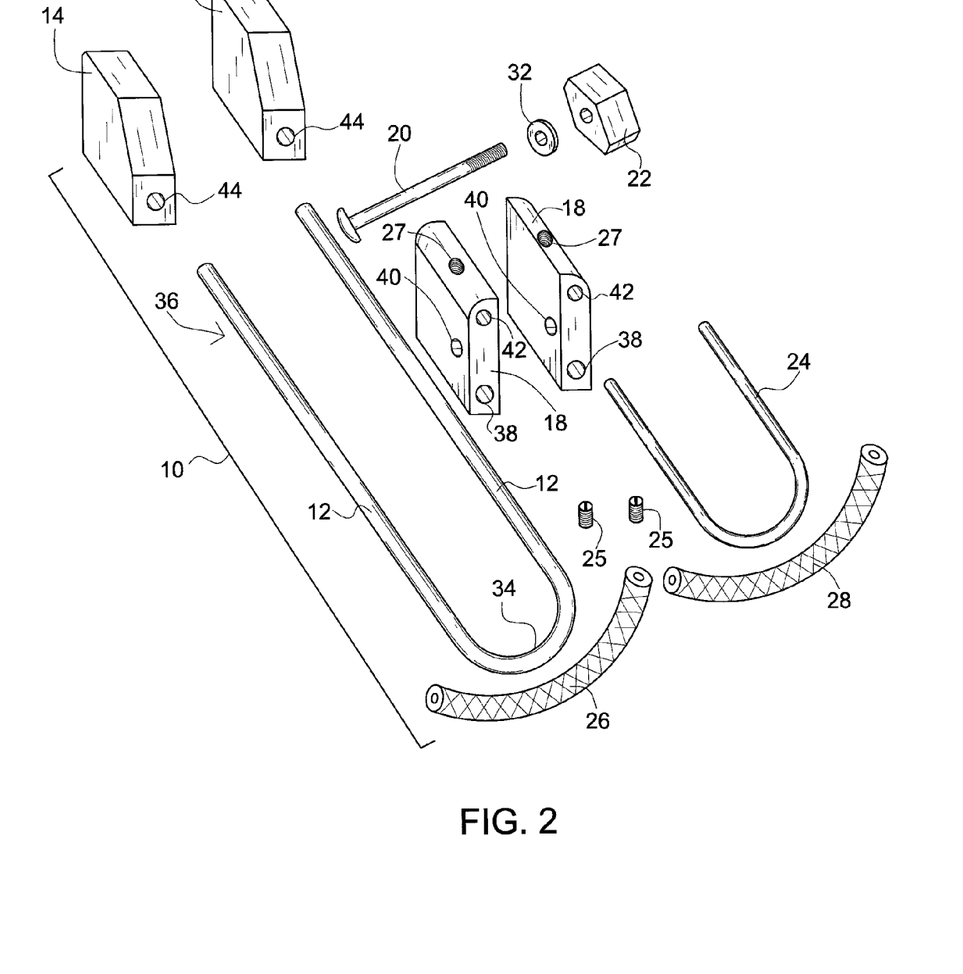
FIG. 2 is an exploded isometric view of the tool according to one embodiment of the present invention.
Figure 3:
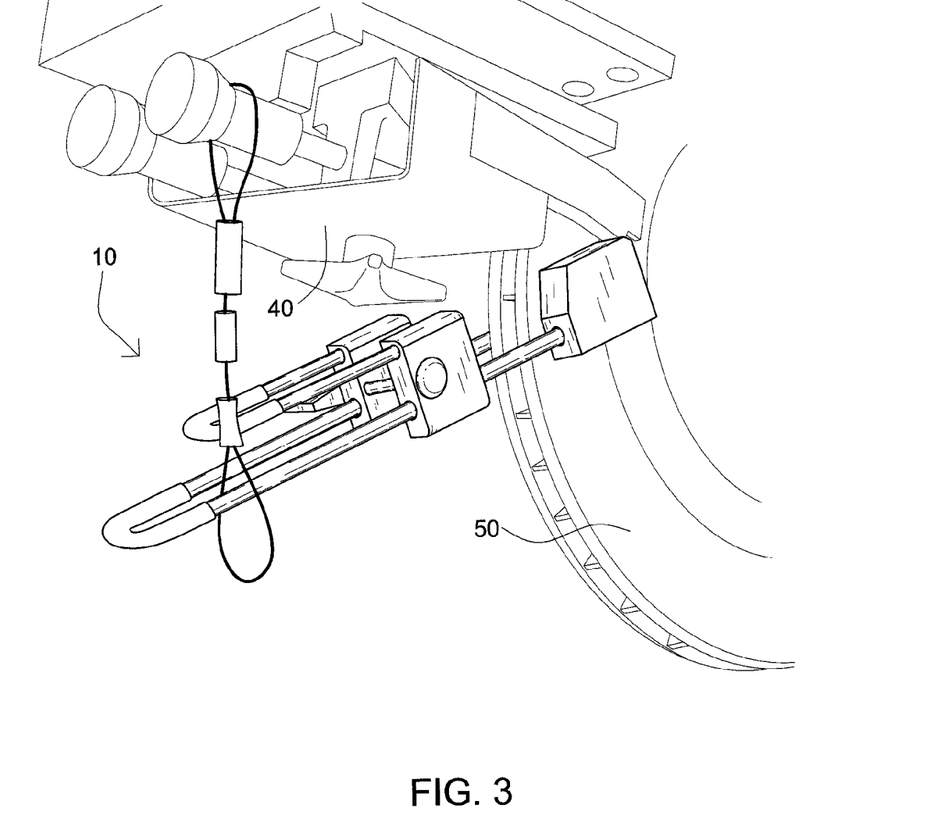
FIG. 3 is an isometric representation of the tool as used to attenuate vibration in a brake rotor during machining thereof according to one embodiment of the present invention.

FIGS. 1-3 illustrate a tool 10 useful for attenuating vibrations induced in the machining of a disk brake rotor 50. In its most basic configuration, the tool comprises: a pair of substantially linear and parallel spaced apart legs 12 that are fixedly coupled together by way of a coupling section/portion 34 proximate their distal ends; a pair of pads affixed to the open proximal ends 14 of the legs; and a clamp assembly 16 adapted to compress the legs towards one another and thereby transfer a compressive force to the respective pads against the disk brake rotor over which the pads have been placed.

In the embodiment illustrated in FIG. 2, the spaced apart legs 12 are portions of a u-shaped rod 36 with a cylindrical cross section and are generally of the same length. The rod is typically comprised of steel and has a diameter of at least 0.163", more preferably at least 0.180" and most preferably at least 0.20". The overall length of the u-shaped rod is about 8" in length and the legs are typically parallel to each other and spaced apart about 0.80-1.2". Accordingly, the u-shaped rod is fabricated from a piece of elongated rod stock about 17" inches in length by bending the rod stock proximate its longitudinal center 180 degrees using a suitable rod or tube bending apparatus.

In contrast, the typical prior art vibration attenuating tool, such as is described above, is comprised of a generally u-shaped cylindrical steel wires that have diameters of about 0.125". The smaller diameter wire is significantly less stiff than the u-shaped rod 36 of the present embodiment making it easier for a user to compress the legs together with his/her hand thereby applying a compressive force to the faces of a disk brake rotor through the legs and the associated pads. However, the inherent flexibility of the thin prior art wire legs limits the amount of force that can be effectively transferred through legs by squeezing them together. As indicated above, the force is often not sufficient to adequately attenuate the vibrations created during the rotor machining process.

The much greater stiffness of the larger diameter rod used in the legs 12 of embodiments of the present invention make the application of significant force to the rotors by squeezing the legs together somewhat difficult as much of the squeezing force that can be applied by a user using a single hand is used to overcome the inherent stiffness of the legs and/or the integral u-shaped portion 34. Accordingly, the aforementioned adjustable clamp assembly 16 is provided in certain embodiments as is discussed in greater detail below to facilitate the application of compressive forces much greater than are typically possible with prior art vibration attenuators.

While the spaced apart legs 12 are illustrated herein as being an integral portion of a u-shaped rod 36, it is to be appreciated that in variations the legs can be coupled by other means as well. For instance, both legs can comprise generally linear rods that are attached to an end bracket such as by fusion, adhesive or mechanical joining processes at each of the leg's respective distal ends. One version of an end bracket for instance can be comprised of a metallic block somewhat similar to the block/brackets 18 described below for the clamp assembly 16 in which the distal ends of the legs are received in spaced bores. It is appreciated that other manners of rigidly fixing the ends of the legs are contemplated as would be obvious to one of ordinary skill in the art to which the invention pertains.

The legs 12 are illustrated and described herein as being cylindrical and/or having a circular cross section. In variations, the legs can have other suitable configurations such as, but not limited to, a rectangular, oval-shaped, hexagonal or diamond-shaped cross section. These other cross sections may even service a functional purpose in the operation of the adjustable clamp provided in certain embodiments as is discussed in greater detail herein below.

The pads 14 are typically comprised of a material that creates a requisite level of friction between the pads and the opposing brake rotor surfaces when the pads are compressed against the rotating rotor surfaces as best shown in FIG. 3. The friction in combination with the compressive forces applied through the pads acts to attenuate the vibrations created during the rotor re-facing operation. Simply, the pad can be just about any material that is not abrasive to a rotating brake rotor 50 and that maintains its physical integrity during the machining process. One class of materials are those from which clutch liners and disk and drum brake pads are fabricated. Another material that has been found to be suitable includes wood fiber reinforced plastic such as is used to make decking for residential decks.

In the illustrated embodiment, the pads 14 are generally rectangular (one corner may be removed to facilitate clearance). Pads having dimensions of about 1.5" long by about 1.25" wide and about 0.50" thick has been found to be effective but other size and shape variations are also contemplated.

As best illustrated in FIG. 2, a bore 44 extends inwardly from one end of each and terminates at a location within the pad 14. The diameter is substantially equivalent to the diameter of the legs 12 such that a leg is snuggly received into the pad when it is pressed into the bore. In some variations, adhesive may also be used to secure the pad in place; however, but utilizing just a friction fit the pads can pivot about the longitudinal axis of the legs ensuring more complete contact between the face of the pad and the brake rotor surface when the pads are compressed against the brake rotor surfaces during use. Furthermore, a friction fit facilitates easier pad removal and replacement.

In one variation that is not illustrated, a second bore extends into each pad in a direction generally perpendicular to the afore-described bore. Short rods or pins can be inserted into these bores that extend outwardly from the pads. In use, these pins are placed behind the cutting arms of the rotor lathe and as such help hold and position the pads in a location directly above and in close proximity to the cutting arms of the rotor lathe 40. Similar positioning pins are described in the prior art cited above.

As mentioned above, the tool includes an adjustable clamp assembly 16 that facilitates the application of a compressive force against the rotor surfaces by way of the pads 14 as transferred through the legs 12. In several embodiments the clamp assembly is adjustable between a large number of positions and in at least some of these embodiments, such as the illustrated embodiment, the clamp infinitely variable or adjustable.

In additional to being adjustable, the clamp assembly 16 in the illustrated embodiment is also adapted to slide along the spaced apart parallel legs 12. This permits a user to adjust the position of the clamp to apply the maximum amount of compressive force to the pads 14. Simply, by moving the clamp closer to the pads the amount of force that can be exerted against the rotor surfaces is increased. In contrast, when the clamp is moved rearwardly away from the pads, the amount of force that can be exerted is reduced through flexure of the legs.

While it is advantageous to have the clamp 16 as close to the outer edge of the rotor 50 as the brake rotor surfaces are being machined, if the clamp is close to the pads, such as when the reach, i.e. the distance from the clamp to the proximal ends of the pads 14 is 3" or less, it is very difficult spread the pads to place the pads over the opposing surfaces of the disk rotor 50 especially when the relatively large diameter and consequentially the stiffness of the legs 12 are considered. The distance between the interior surfaces of the pads is about 0.5-0.8" when parallel legs spaced the distances specified above are utilized. However, the thickness of a brake rotor 50 can be well in excess of 1.0" requiring the legs to be spread apart to place them over the rotors. Accordingly, by being able to move the clamp rearwardly to increase the reach of the tool, the legs and pads can be spread more easily by a user to place the pads onto the rotor's surfaces. Further, the clamp can be slid forwardly towards the pads close to the rotor's circumferential edge to minimize the reach and maximize the amount of compressive force than can be imparted against the rotor surfaces to more effectively attenuate vibrations.

The clamp assembly 16 of the illustrated embodiment comprises: (i) a pair of brackets 18 adapted for slidable attachment to the pair of spaced apart substantially parallel legs 12; (ii) a threaded fastener 20 and associated threaded nut 22; and (iii) an anti pivot u-shaped rod 24 with a set screw to hold it fixedly in place.

The pair of brackets 18 or blocks can be fabricated from any suitable material including but not limited to aluminum, reinforced or unreinforced plastic, and steel. As illustrated each bracket includes a slide bore 38 extending through the bracket in which a respective leg 12 of the pair of legs is received. The slide bores are similarly sized as the legs but generally slightly larger in diameter to permit the brackets to be easily slid along the legs during use.

A fastener bore 40 is also provided in each bracket 18 that is generally perpendicular to the slide bore 38. The threaded fastener 20 is received through these bores spanning the distance between the brackets when they are received on the spaced legs 12. A suitability threaded nut 22 is threadably received over the end of the fastener so that by tightening the nut onto the fastener by rotating the brackets are pushed towards each other. In the illustrated variation, the nut comprises a wingnut to facilitate easy actuation by a user using his/her fingers although in variations, different types of nuts and fasteners can be utilized as would be obvious to one of ordinary skill in the art to which this invention pertains. One or more washers 32 may be provided as well.

As can be appreciated, the fastener 20 and the associated fastener bores 40 must be located above or below the slide bores 38 on the brackets 18. Accordingly when cylindrical rods/legs 12 and cylindrical slide bores are utilized, the tightening of the fastener will have a tendency to cause the brackets to rotate or pivot towards one another until either the top edges of the brackets touch or perhaps more significantly the angle of the axes of the opposing slide bores are no longer aligned relative to each other and relative to the axis of the fastener such that the fastener begins to bind in the bores making the tightening and loosening of the fastener more difficult. Accordingly, it is desirable to minimize the pivoting of the brackets during tightening of the fastener.

Figure 4:
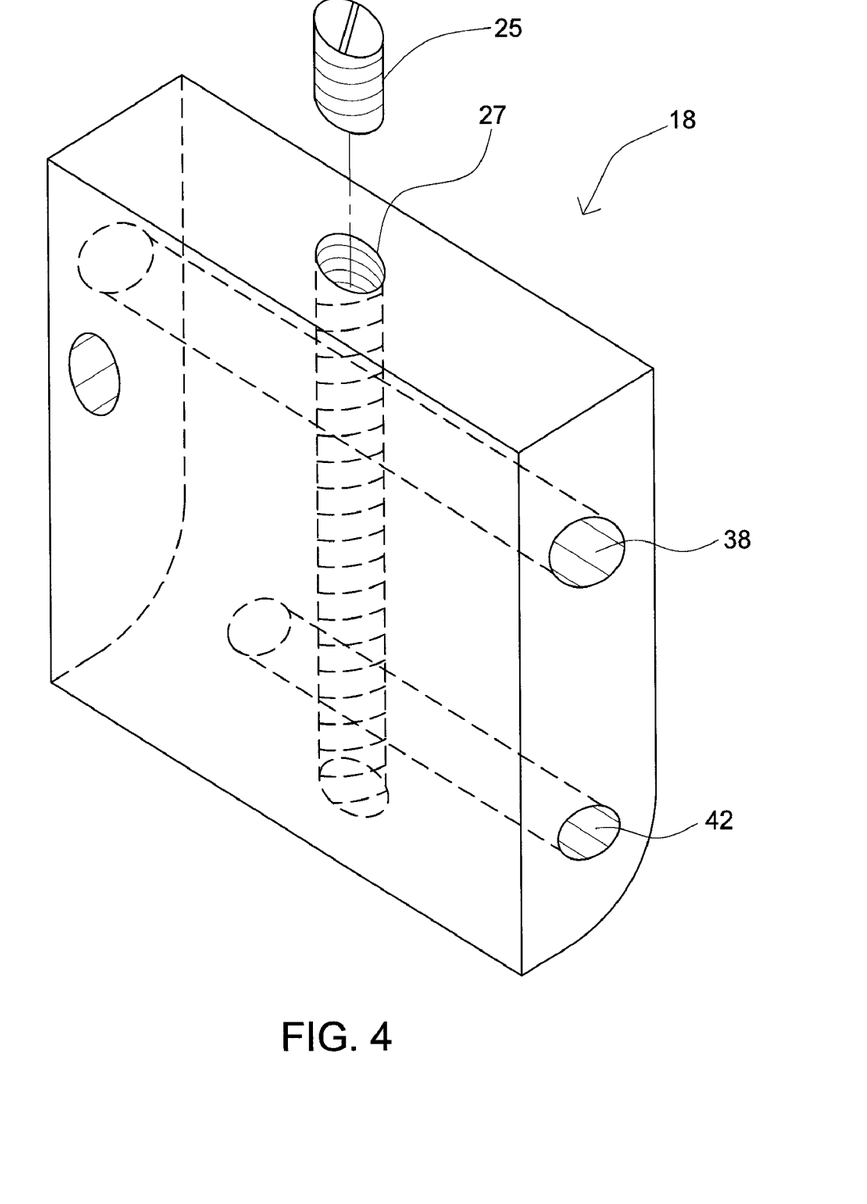
FIG. 4 is an isometric view of a clamp assembly bracket according to one embodiment of the present invention.

One means of minimizing bracket 18 pivoting while maintaining the ability of the clamp assembly 16 to slide freely along the cylindrical legs 12 is through the use of an anti-pivot u-shaped rod 24 located typically, although not necessarily, on the opposite side of the fastener relative to the spaced legs. The anti-pivot u-shaped rod has its own legs that are generally parallel to the spaced apart legs with the ends of the anti-pivot rod's legs being securely fastened to the brackets 18, such as being tightly received into another set of bores 42 in the brackets. A threaded bore 27 which is typically perpendicular to and through the anti-pivot rod bore 42 extends inwardly from the bottom of the bracket to receive a set screw 25 to help hold the anti-pivot u-shaped rod in place (see FIG. 4). In other variations, the anti-pivot rod can be interference fit or even adhesively bonded in place. As indicated above, a biasing force developed in the anti-pivot u-shaped rod as the arms thereof are compressed counteracts the rotational tendency of the brackets resulting from the tightening of the fastener. Accordingly, the axes of the respective slide bores 40 and the fastener 20 remain suitably aligned.

The anti-pivot u-shaped rod 24 is often of a smaller diameter relative to the u-shaped rod 36 that includes the spaced legs 12 when both are made of the same material, such as steel, but the length of the anti-pivot u-shaped rod is also typically shorter. In the embodiment utilizing the u-shaped rod described above of which the spaced apart legs comprise portions, a steel anti-pivot u-shaped rod 24 has a diameter of at least 0.130", more preferably at least 0.150" and most preferably at least 0.18" and an overall length of about 4.25". However, the actual dimensions in other variations can vary substantially and significantly depending on the type of material of which both u-shaped rods are comprised as well as their lengths. The anti-pivot rod is typically fabricated in a similar manner as the other u-shaped rod.

In some variations of the described embodiment, polymeric tubing 26 & 28 may be provided to cover a portion of one or both of the u-shaped rods 24 & 36. The tubing acts to protect portions of the rotor lathe 40 that the tool may come into contact with during use. Additionally, in some variations a lanyard 30 can be provided that is received on one end over either u-shaped rod and includes another loop on its opposing end that can be secured over a knob or other protrusion on the rotor lathe. Accordingly, should the tool become accidentally dislodged from the rotor during use the tool will be restrained minimizing safety risks. Further, the lanyard provides a convenient means for storing the tool on the rotor lathe so that it is conveniently available for use.

A Method of Using an Embodiment of the Tool During the Machining of a Rotor

Two types of brake lathes are typically used to machine a disk brake rotor: one in which a rotor removed from a vehicle is placed in and spun by the lathe; and a portable type wherein the rotor remains on the vehicle and the rotor is spun about the associated axel of the vehicle. With either variation, a pair of cutting arms are provided that are moved radially along the opposing surfaces of the rotor as the rotor is spun to remove material therefrom and reface both surfaces of the rotor. As discussed above, the machining operation tends to create vibrations that can create undesirable noise and negatively impact the planarity of the surfaces as a result of the facing operation. Accordingly, it is desirable to attenuate the vibrations by using embodiments of the tool described herein.

After the rotor lathe 40 has been positioned and set up relative to a disk rotor 50, a user slides the clamp assembly 16 of the tool 10 rearwardly along the spaced apart legs 12 so that he can easily spread the tool's pads 14 apart. The pads are then spread apart and placed over the rotor and typically positioned just below or above the cutting ends of the lathe's cutting arms.

Next, the user slides the clamp assembly 16 forwardly towards the pads 14 until just shy of the edge of the rotor 50. The clamp is then tightened to further compress the pads against the rotor surfaces.

As the rotor is being resurfaced the user will often move the tool in unison with the rotor. As discussed above, some variations may include wire protrusions that interface with the cutting arms to push or pull the tool along with the cutting arms as they are moved across the rotor surfaces. In other variations, the user may simply hold the tool in his/her hand and move the tool manually. As the tool is being used, the user can adjust the clamp 16 as necessary to apply more or less compressive force by one or both of sliding the clamp assembly along the legs 12 of rotor and adjusting the fastener 16.

Alternative Embodiments and Other Variations

The various embodiments and variations thereof illustrated in the accompanying Figures and/or described above are merely exemplary and are not meant to limit the scope of the invention. It is to be appreciated that numerous variations of the invention have been contemplated as would be obvious to one of ordinary skill in the art with the benefit of this disclosure.

For instance, variations of the tool are contemplated wherein the slide bores and the associated spaced apart legs are not cylindrical and as such the brackets are inhibited from pivoting as the clamp's fastener is tightened. Effectively, such a configuration would minimize or eliminate the need for the anti-pivot u-shaped rod, although the non-cylindrical shapes may be more susceptible to binding when the fastener is tightened thereby making sliding of the clamp along the leg more difficult.

The interface between the clamp assembly and the spaced part legs as described above is primarily one of a pair of bores extending through the clamp brackets/blocks. However, other means of slidably securing the clamp to the legs are contemplated such as suitably shaped rails and receivers.

Further, the materials specified herein for the construction of the tool are to be considered merely exemplary. It is to be appreciated that other materials can be used to fabricate suitable variations and other embodiments of the tool described and claimed herein.

I claim:

1. A tool for attenuating vibrations in a disc brake rotor during machining of surfaces of the rotor, the tool comprising:

a u-shaped first rod having left and right first rod legs and left and right first rod ends;

a u-shaped second rod having left and right second rod legs and left and right second rod ends;

left and right pads, the left and right pads each having a generally planar surface facing a generally planar surface of the other pad, the left pad being attached to the left first rod leg proximate the left first rod end, and the right pad being attached to the right first rod leg proximate the right first rod end;

left and right compression brackets spaced apart from each other, each compression bracket including (i) a first bore extending therethrough with a respective first rod leg being received into and through the first bore, and (ii) a second bore with a respective second rod leg received therein; and an adjustable fastener, the adjustable fastener being coupled with the compression brackets and being adapted to vary the distance between the compression brackets whereby in use the left and right pads are compressed against a disk brake rotor by way of the left and right first rod legs.

2. The tool of claim 1, wherein the pads are comprised of an automotive brake pad friction material.

3. The tool of claim 1, wherein the first rod comprises steel and has a diameter of at least 0.18".

4. The tool of claim 3, wherein the second rod comprises steel and has a diameter of at least 0.15".

5. The tool of claim 1, wherein when in an uncompressed state, the opposing planar surfaces of the respective pair of pads are spaced apart 0.50-0.80".

6. The tool of claim 1, wherein the left and right first rod legs are spaced apart from the left and right second rod legs and the respective rod legs are generally parallel to each other.

7. The tool of claim 1 wherein the left and right compression brackets are adapted to slide along the respective left and right first rod legs in the first bore.

8. The tool of claim 1, wherein the adjustable fastener includes a threaded bolt, the threaded bolt being received through a third bore in each of the left and right compression brackets, the third bore being generally perpendicular to the first bore.

9. The tool of claim 6, wherein the adjustable fastener includes a threaded bolt, the threaded bolt being received through a third bore in each of the left and right compression brackets, the third bore being generally perpendicular to the first bore and being located between the first and second bores.

10. The tool of claim 8, wherein the adjustable fastener further includes a wing nut.

11. The tool of claim 1, furthering including a lanyard, the lanyard being slidably secured to one of the first and second rods.

12. The tool of claim 1 further comprising one or two polymeric sheaths, each polymeric sheath being received over a curved portion of either the first or second rod.

13. A tool for attenuating vibrations in a disc brake rotor during machining of surfaces of the rotor, the tool comprising:

a u-shaped first rod having left and right first rod legs and left and right first rod ends, the left and right first rod legs being spaced apart from each other and being generally parallel to each other;

left and right pads, the left and right pads each having a generally planar surface facing a generally planar surface of the other pad, the left pad being attached to the left first rod leg proximate the left first rod end, and the right pad being attached to the right first rod leg proximate the right first rod end; and an infinitely adjustable clamp, the clamp adapted to move the first and second legs and the associated planer surfaces of the left and right pads towards each other and against the brake when tightened to apply a compressive force against opposing surfaces of the brake rotor, wherein the clamp is adapted to slide along the left and right legs, and wherein the clamp comprises:
(i) a left block;
(ii) a right block; and
(iii) a u-shaped second rod with respective left and right second rod legs having left and right second rod ends;
wherein each block includes a first bore extending therethrough through which a respective left or right first rod leg is slidably received, and wherein each block is attached to a respective left or right second rod end.

14. The tool of claim 13, wherein the clamp comprises:
(i) a left bore extending into the left block and therethrough; and
(ii) a right bore extending into the right block and therethrough, wherein the left and right first rod legs are slidably received in the respective left and right bores, and wherein each of the left and right blocks are further inhibited from rotating about a longitudinal axis of the respective left and right first rod legs.

15. The tool of claim 13, wherein:

the clamp further comprises a threaded fastener and a threaded nut;

the left and right blocks each further include a second bore; and the threaded fastener is received through the second bore on each block with the nut being threaded onto the threaded fastener.

16. A tool for attenuating vibrations in a disc brake rotor during machining of surfaces of the rotor, the tool comprising:

a substantially linear elongated first left leg including a first left end and an opposing second left end;

a substantially linear elongated first right leg including a first right end and an opposing second right end, the first right leg being spaced apart from and generally parallel to the first left leg;

a pair of pads, each pad having a generally planar surface facing a generally planar surface of the other pad, one pad being attached to the first left end and the other pad being attached to the first right end;

a coupling section, the coupling section being affixed with the second left and second right ends holding the first left and right legs in the spaced apart relationship;

an infinitely adjustable clamp coupled with the first left and right legs, wherein the clamp coupling comprises a left member to engage with the first left leg and a right member to engage with the first right leg, the clamp adapted to (i) move the first left and right legs and the associated planer surfaces of the left and right pads towards each other, and (ii) slide longitudinally along the first left and right legs; and an anti-pivoting mechanism for the infinitely adjustable clamp, wherein the anti-pivoting mechanism counteracts the rotational tendency on the left and right members of the infinitely adjustable clamp that results from increased clamping action.

17. The tool of claim 16, wherein the left and right legs and the coupling section comprise a U-shaped rod with the left and right legs comprising linear portions thereof and the coupling section comprising a bent or curved base portion thereof.

18. The tool of claim 16, wherein the anti-pivoting mechanism comprises:
   a substantially linear elongated second left leg including a first left end and an opposing second left end;
   a substantially linear elongated second right leg including a first right end and an opposing second right end, the second right leg being spaced apart from and generally parallel to the second left leg;
   a bore hole in each of the left and right members of the infinitely adjustable clamp, such that the second left leg's opposing second left end can be inserted into the left member and the second right leg's opposing second right end can be inserted into the right member,
      wherein the inserted second left and right legs are substantially parallel to the first left and right legs,
      wherein the inserted second left and right legs are each fixedly coupled to its associated member of the infinitely adjustable clamp, and
      wherein the second left leg's first left end and the second right leg's first right end are fixedly coupled.

19. The tool of claim 16, wherein the anti-pivoting mechanism comprises:
   the substantially linear elongated first left leg including a first left end and an opposing second left end;
   the substantially linear elongated first right leg including a first right end and an opposing second right end, the right leg being spaced apart from and generally parallel to the first left leg; and
   the coupling section,
      wherein the first left and right legs are each non-cylindrical,
      wherein the first left leg's cross-sectional shape substantially matches the shape of the mating bore of the left member of the infinitely adjustable clamp and the left pad,
      wherein the first right leg's cross-sectional shape substantially matches the shape of the mating bore of the right member of the infinitely adjustable clamp and the right pad.

* * * * *